United States Patent [19]

Itoh et al.

[11] 4,049,581
[45] Sept. 20, 1977

[54] METHOD FOR PREPARING HYDROCARBON CONVERSION CATALYST USING ACID AMIDE SOLUTIONS TO IMPREGNATE A TIN COMPONENT

[75] Inventors: Takuji Itoh, Sayama; Eiichiroh Nishikawa, Ohi; Tadashi Miura, Ohi; Takashi Yamahata, Ohi, all of Japan

[73] Assignee: Toa Nenryo Kogyo Kabushiki Kaisha, Tokyo, Japan

[21] Appl. No.: 561,930

[22] Filed: Mar. 25, 1975

[30] Foreign Application Priority Data

Mar. 30, 1974 Japan .................................. 49-36404

[51] Int. Cl.$^2$ ...................... B01J 23/96; B01J 23/92; C10G 35/08
[52] U.S. Cl. ............................ 252/466 PT; 208/138; 208/139; 252/472
[58] Field of Search ............... 252/428, 466 PT, 472, 252/429 R, 428, 441; 208/140, 139

[56] References Cited

U.S. PATENT DOCUMENTS

| 3,519,575 | 7/1970 | Bozik et al. | 252/472 |
| 3,691,102 | 4/1972 | Swift et al. | 252/466 PT |
| 3,803,052 | 4/1974 | Hayes | 208/140 |
| 3,875,049 | 4/1975 | Kluksdahl | 208/140 |
| 3,883,419 | 5/1975 | Itoh | 252/466 PT |

Primary Examiner—Winston A. Douglas
Assistant Examiner—P. E. Konopka
Attorney, Agent, or Firm—Reuben Miller

[57] ABSTRACT

Improved distribution of the tin component of a hydrocarbon conversion catalyst also containing a Group VIII noble metal and halogen on a carrier is obtained by impregnation of the carrier with a solution of an acid amide or derivatives thereof and a soluble tin compound.

17 Claims, 2 Drawing Figures

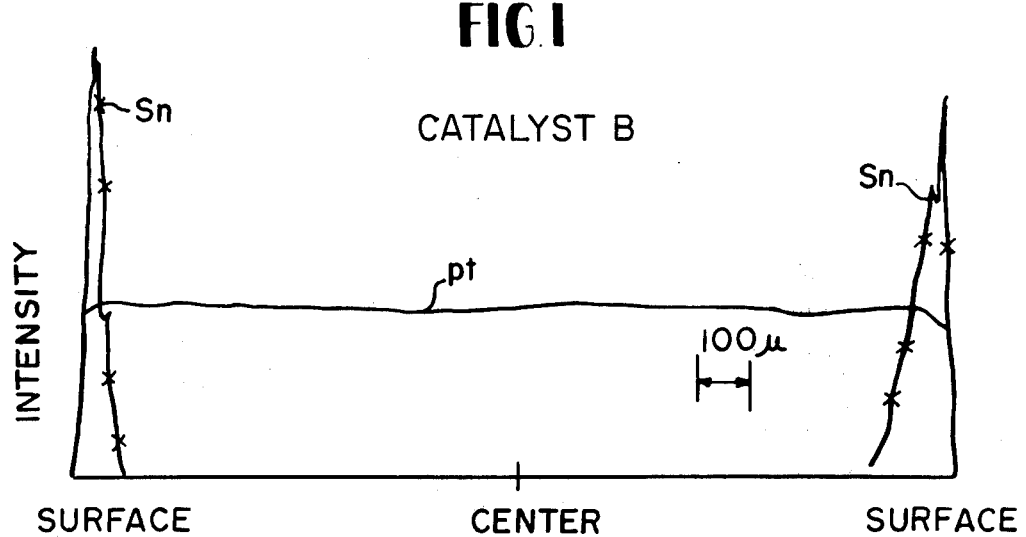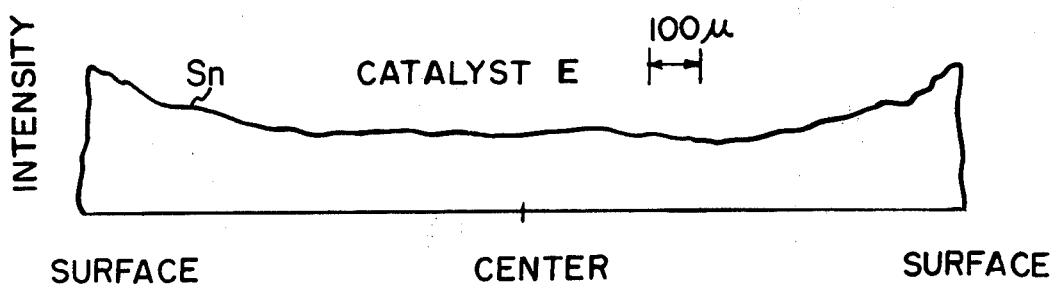

METHOD FOR PREPARING HYDROCARBON CONVERSION CATALYST USING ACID AMIDE SOLUTIONS TO IMPREGNATE A TIN COMPONENT

This invention relates to a method for preparing a hydrocarbon conversion catalyst, particularly to a catalyst useful in various petroleum refining and petrochemical processes such as, for example, hydrodesulfurization, hydrodenitrification, alkylation, isomerization, dehydrogenation, reforming, hydrocracking, etc. In more detail, the present invention pertains to a method for preparing a bimetallic hydrocarbon conversion catalyst useful in heterogeneous catalysis and comprising two kinds of active metallic components on a refractory carrier.

Catalytic conversion in the presence of a solid catalyst is widely employed in petroleum refining, a petrochemical and other chemical process. A solid catalyst plays such an immportant role in heterogeneous catalysis that a great deal of effort has been paid for the improvement and development thereof. Recently, it has become desirable both socially and technically to develop an effective catalyst so as to satisfy the recent demand for the production of a large amount of low-cost catalyst suitable for the production of pollution-free fuels.

In the present description, catalytic reforming, or reforming, of hydrocarbons is defined as the reactions involving dehydrogenation of naphthenes, dehydrocyclization and isomerization of paraffins, hydrocracking of naphthenes and paraffins, etc., or the mixture thereof. The reforming of hydrocarbons is generally employed for the purpose of supplying a high-octane-number blending stock to fuel oils of internal combustion engine, an aromatic solvent, and other aromatic-rich chemical products by the reactions described above.

In order to obtain the desired reaction product in good yield and desired stability by a hydrocarbon conversion process, such as reforming, etc., it is required that the catalyst should have not only high activity and good stability but also excellent catalyst life so as to be durable for long-time and continuous usage. Ordinarily, in the reforming of hydrocarbons, it is required that a $C_5+$ hydrocarbon product having a constant octane number must be obtained at lower temperatures with good yield while maintaining the constant conversion of a feed stock hydrocarbon fraction to the product having a constant octane number. It is also an essential character required for a conversion catalyst to maintain a high-level yield of $C_5+$ hydrocarbon fractions while repressing the production of cracked gas keeping constant conversion for a long-time period. Generally, the platinum-on-alumina catalyst has been widely utilized in the catalytic reforming of hydrocarbons contributing to the production of internal combustion engine fuels and a variety of aromatic hydrocarbon oils. From the economical point of view, the amount of expensive platinum containing catalyst utilized in the process must be decreased to a minimum. Another problem that must be considered as to the industrial platinum catalyst is the gradual loss of activity due to agglomerization of the platinum metal particles.

Several methods of overcoming these difficulties such as, for example, a method for maintaining good dispersion of platinum particles in the catalyst by adding a suitable amount of a halogen compound to a feed stock oil during operation, or a method of redispersion of platinum particles by treating the deactivated catalyst with a halogen compound, etc., have been disclosed in the art.

On the other hand, it has now been discovered that a platinum-tin bimetallic catalyst supported on a refractory oxide support wherein the tin component is uniformly distributed throughout the support shows excellent activity, stability and selectivity. While the reason why such platinum-tin catalysts show such excellent catalyst properties is not precisely known, it is believed that an interaction between the platinum and tin contributes to these desired results. In attempting to prepare such catalysts, it was found that the usual well-known methods of preparing bimetallic catalysts did not result in the uniform distribution of the tin component throughout the support or carrier. In the use of such known procedures, the platinum component was found to be distributed uniformly from the surface into the inner part throughout the carrier while the tin component was found to be concentrated on the surface of the carrier and not uniformly distributed throughout the carrier as was the case with the platinum component.

It is an object of our invention to provide an improved process for the preparation of a hydrocarbon conversion catalyst comprising a refractory carrier, a Group VIII noble metal component, a tin component and a halogen component. More particularly, the object of the present invention is to provide an improved process for the preparation of such a catalyst wherein the tin component is uniformly dispersed from the surface throughout the inner part of the catalyst. These and other objects may be achieved by the present invention wherein the hereinbefore described hydrocarbon conversion catalyst comprising a refractory carrier, a Group VIII noble metal component, a tin component and a halogen component is prepared by a procedure wherein the tin component is introduced into said carrier by impregnating the carrier with a solution comprising an acid amide or a derivative thereof and a soluble compound of tin.

In the present invention, a refractory carrier, especially a refractory inorganic oxide carrier, is used as a carrier. It contains, for example, one or more of alumina, bentonite, clay, diatomaceous earth, zeolite, silica, activated carbon, magnesia, zirconia, thoria, etc. The most preferred carrier is alumina, to which if desired a suitable amount of other refractory carrier materials such as silica, zirconia, magnesia, etc., may be added within the range of about 1 to 20 wt.%.

The preferred alumina carrier has a surface area of more than 50m²/g, a bulk density of about 0.3 to 0.8 g/ml, an average pore volume of about 0.2 to 1.1 ml/g, and an average pore diameter of about 50 to 300A. Suitable alumina materials are the crystalline alumina known as the $\gamma$-, $\eta$-, or $\chi$- alumina, which can be prepared by adding acids or bases to a solution of soluble alumina compounds such as aluminum chloride, aluminum sulfate, sodium aluminate, aluminum alkoxide, etc., to produce a hydrated alumina followed by drying and calcination thereof. Silica, or other carrier materials may be added to the alumina by the coprecipitation when forming the hydrated alumina or by mixing the precipitates thereof.

The metallic component of the Group VIII metals of the Periodic Table includes one or more platinum group metal components such as ruthenium, rhodium, palladium, osmium, iridium, platinum etc. However, platinum is the preferred component. The Group VIII metal component is supported on the carrier within the range of from about 0.01 to 3 wt. %. preferably from about 0.05 to 1 wt. %. It is preferable to prepare the catalyst by the impregnation method by contacting the carrier with a solution of a soluble compound of one or more of the noble metals although it may be possible to prepare the catalyst by the coprecipitation or precipitation method. Any soluble compound may be used, but a soluble compound which can be easily subjected to thermal decomposition and reduction is preferred; for example, inorganic salts such as halide, nitrate, inorganic complex compounds, or organic salts such as the complex salt of acetylactone, amine salt, etc. Where the Group VIII noble metal is platinum, platinum chloride, platinum nitrate, chloroplatinic acid, ammonium chloroplatinate, potassium chloroplatinate, platinum polyamine, platinum acetylacetonate, etc., are preferably used.

The impregnation solution of the noble metal compound is prepared by dissolving the compounds mentioned above into water or any other inorganic or organic solvent. The concentration of the metallic component ranges from about 0.01 to 2 wt. %, preferably from about 0.05 to 1 wt. %. The pH of the impregnation solution should be controlled to less than about 4, preferably less than 3, by adding a suitable acid to it. By controlling the pH within the above range, the active component can be effectively dispersed into the inner part of the catalyst. Generally, it is preferred to use a halogenoacid aqueous solution of the noble metals.

The following description concerns the method of combining the essential tin component of the catalyst of the present invention into the carrier. The impregnation of a solution of a soluble compound of tin into a carrier may be carried out simultaneously with, prior to, or following the impregnation of the noble metal component into the carrier. The soluble compounds of tin which may be used, will include but not be limited to stannous or stannic halide, nitrate, sulfate; acetate, amine complex, di-or tetra-alkyl compounds like di-or tetra-ethyl, propyl butyl, or octyl-tin, di-or tetra-alkoxy compound like di-, or tetra-ethoxy tin, etc. However, the halide is the best when considering its remarkable effect on speed of reaction, ease of operation, economy, availability, etc.

The impregnation solution of the tin component is prepared by dissolving the soluble compound as mentioned above in an organic solvent. The present invention resides in the discovery that as to the impregnation of the tin component the organic solvent used plays a remarkably important role. In our invention, the desired objective is attained by using an acid amide or the derivative thereof as the solvent.

The acid amide or the derivative thereof used in the present invention comprises an amide which is liquid at ambient conditions like the primary amides $RCONH_2$, secondary amides $(RCO)_2NH$, tertiary amides $(RCO)_3N$, or the derivative thereof. For example, formamide, acetoamide, propionamide, dialkyl amide, dialkyl acetoamide, N-alkyl acetoamide, oxamide, etc., are representative of one or more components which may generally be used. Dialkylformamides, especially dimethylformamide, are particularly preferred. Water is added to the solvents above mentioned if required. The water can be added in the amount sufficient to solubilize the acid amide or the derivative thereof, for example, within the range of from about 2 to 15%. An acid amide which is solid in its normal state can be liquified by mixing it with water.

The concentrations of the tin in the impregnation solution is from about 0.01 to 2 wt.%, preferably from about 0.05 to 1 wt. %. The impregnation of the noble metal component and tin component into a carrier is carried out by impregnating the carrier with the solution of the respective metal compounds. The amount of impregnation solution should be sufficient to completely immerse the carrier, usually within the range from about 1 to 20 times of the carrier by volume, depending on the metal concentration in the impregnation solution. The impregnation treatment may be carried out under a wide range of conditions including ambient or elevated temperatures and atmospheric or superatmospheric pressures. The noble metal or tin component can be dispersed on the carrier by such impregnation methods as the simultaneous impregnation of both components using the same impregnation solution, or more preferably the impregnation of the tin component following the dispersion of the noble metal component within the carrier.

In a preferred embodiment of the present invention:

1. a carrier is impregnated with an aqueous halogenoacid solution of noble metal compound followed by washing, drying and/or calcination, and
2. the impregnated noble metal catalyst is impregnated with an acid amide solution containing a dissolved tin compound followed by washing, drying and/or calcination, whereby the tin component can be dispersed uniformly to the inner part of the catalyst. It is also required to promote the catalyst performance in the hydrocarbon conversion by adding a halogen component. Fluorine or chloride is preferred as a halogen component, but bromine can be used, too. The halogen is contained within the range of 0.1 to 3 wt. % in the catalyst, preferably within the range of about 0.3 to 2 wt. %. When using chlorine as a halogen component it is contained within the range of about 3 to 2 wt. %, preferably within the range of about 0.5 to 1.5 wt. %. The introduction of halogen into catalyst can be carried out by any method and at any time of the catalyst preparation, for example, prior to, following or simultaneously with the impregnation of the noble metal or tin component. In the usual operation, the halogen component is introduced simultaneously with the incorporation of the noble metal or tin component. It can also be introduced by contacting a carrier material in a vapor phase or liquid phase with a halogen compound such as hydrogen fluoride, hydrogen chloride, ammonium chloride, etc.

The noble metal-tin catalyst prepared in accordance with the procedure of the present invention has extremely good selectivity and stability when used in hydrocarbon conversion processes because of the uniform distribution of the tin component from the surface to the inner part of the catalyst.

The catalyst of the present invention can contain an optional third metallic component if required such as a component selected from the Group I metals, Group II metals, Group IV metals except the essential tin component, Group VI metals, Group VII metals or Group VIII metals except the essential noble metal component. For example, copper, cadmium, zinc, germanium, lead, iridium, osmium, ruthenium, rhodium, etc., are preferred. By adding the third component to the essential noble metal-tin components the catalyst performance can be promoted. Although it can be added by any usual method, it is preferable to add it by an impregnation method within the range of about 0.01 to 2 wt. % based on the catalyst.

The drying treatment in the manufacturing process of the present invention, catalyst is carried out by heating at a temperature above about 80° C, preferably between about 80° and 120° C in the presence of nitrogen or oxygen in an air stream, and the calcination treatment is carried out at a temperature between about 400° to 700° C in the presence of oxygen in an air stream. The washing is conducted using water or an organic solvent such as alcohol, ether, hydrocarbon, etc.

The catalyst of the present invention can be prepared in any shape, such as spheres, tablets, or extrudates and the preferred type is dependent on the kind of hydrocarbon conversion process.

The noble metal-tin catalyst of the present invention is utilized in such hydrocarbon conversion processes as reforming, hydrocracking, catalytic isomerization, catalytic alkylation, etc., and also in hydrofining, hydrotreating and hydrodesulfurization of hydrocarbons. The catalyst is most effective in the catalytic reforming process under the conditions exemplified in the following using hydrocarbon fractions ranging from a light naphtha fraction having a boiling point between about 40° to 120° C to a heavy naphtha fraction having a boiling point between about 100° and 170° C or a kerosene fraction having a boiling point between about 150° and 250° C.

| Feedstock Oil | Heavy Naphtha Fraction (Boiling Point: about 100–170° C) | Kerosene Fraction (Boiling Point: about 150–250° C) |
| --- | --- | --- |
| Reaction Temperature, ° C | 500 | 500 |
| Reaction Pressure, kg/cm² | 10 | 10 |
| Liquid Hourly Space Velocity, W/H/W | 1.5 | 1.0 |
| Hydrogen/ Hydrocarbon, mole ratio | 10 | 10 |

It is apparent from the above reaction conditions that the reforming process using a catalyst of the present invention makes it possible to operate under extremely low pressures.

As is described hereinabove, the present invention relates to a method for preparing a hydrocarbon conversion catalyst comprising a noble metal component of the Group VIII metals of the Periodic Table, a tin component and a halogen component by impregnating a carrier with an impregnation solution containing the tin component and an acid amide or the derivative thereof whereby the tin component is dispersed uniformly from the surface to the inner part of the catalyst. In our invention, the distribution of the metals supported on the carrier was analyzed by the EPMA ray technique, for example, EMX-SM apparatus of Shimazu CO. at an accelerated electric voltage of 20KV and electric current of 0.05 $\mu$ A.

The following examples are given to illustrate further the present invention.

EXAMPLE

Catalysts were prepared by the following procedure.

CATALYST A 100 gr. of an alumina carrier having a specific surface area of 173 m²/gr. was impregnated with 500 ml. of an aqueous solution of 0.1 N hydrochloric acid into which 0.80 gr. of chloroplatinic acid $H_2PtcL_6.2H_2O$ was dissolved. The impregnated alumina was after 48 hours separated from any remaining liquid and then dried for 4 hours at 120° C. The product catalyst contained 0.3 wt. % of platinum.

CATALYST B 4.0 gr. of Catalyst A were impregnated with 25 ml. of a solution of methanol into which 0.0347 gr. of stannous chloride $SnCl_2.2H_2O$ was dissolved. After 48 hours, the impregnated catalyst was subjected to suctioning off of methanol and then dried for 4 hours at 120° C.

CATALYST C

Catalyst A was impregnated with a solution of ethanol into which stannous chloride $SnCl_2.2H_2O$ was dissolved according to the description in laid-open Japanese Patent Specification No. 1380/71. After 48 hours, the impregnated catalyst was sujected to suctioning off of ethanol and then dried for 4 hours at 120° C.

CATALYST D

Catalyst D was prepared by the same method as Catalyst B except that acetone was used instead of methanol as a solvent of stannous chloride.

CATALYST E

Catalyst E was prepared by the same method as Catalyst B except that dimethyl formamide DMF was used instead of methanol as a solvent of stannous chloride.

Referring to the catalysts obtained above, the cross sections of Catalysts B and E were analyzed as to platinum and tin distribution using the EPMA ray technique, and the results were illustrated in FIGS. 1 and 2. It is apparent from the figures that the tin component can be distributed to the inner part of about 750$\mu$ by using dimethyl formamide solvent as in case of Catalyst E, while in contrast it is distributed ununiformly within 100$\mu$ from the surface by using conventional methanol solvent as in case of Catalyst B.

To appraise the performance of the catalysts, a n-hexane feed was catalytically reformed under atmospheric pressure in the presence of Catalysts A to E. After filling the reactor vessel with the catalysts, the following pretreatments were carried out in the order as described below.

1. Calcination, at 500° C for 1 hour in the air stream with a velocity of 60 ml./min.
2. N₂ purge, with a N₂ flow rate of 150 ml./min. for 0.5 hours.
3. Hydrogen reduction, with a H₂ flow rate of 60 ml./min. at 500° C, for 1 hour.

On finishing the above pretreatment, the reforming was conducted under the following conditions.

| | |
| --- | --- |
| Pressure | atmospheric |
| Temperature | 500° C |
| Feedstock | n-hexane |
| Liquid Hourly Space Velocity | 1.0 W/H/W |

-continued

| Hydrogen/Feedstock | 12 mole ratio |

The results are illustrated in Table 1. In addition, the results of the EPMA ray analysis, i.e., r/R wherein R means catalyst diameter and r means a diameter of the part having tin distribution was shown.

As is apparent from Table 1, it is found that the tin component can be dispersed into a far inner part of the catalyst and the catalyst performance such as deactivation rate and benzene yield is more remarkably improved when dimethyl formamide DMF is used as a solvent of tin as compared with the case when ethanol solvent is used.

TABLE 1

ACTIVITY APPRAISAL OF VARIOUS CATALYSTS USED IN N-HEXANE REFORMING

| Catalyst | Deactivation Rate* Constant (Kd) (hr$^{-1}$) | Benzene** Yield (mole %) | r/R |
|---|---|---|---|
| A(Platinum Catalyst) | 9.8 | 3.1 | — |
| B (Well-known Catalyst) | 4.7 | 6.9 | 0.117 |
| C(") | 5.5 | 5.1 | 0.106 |
| D(") | 2.4 | 9.2 | 0.360 |
| E(Catalyst of the present invention) | 0.4 | 31.3 | 1.0 |

*$Kd = -\frac{1}{t}\left(\frac{1}{Xo} - \frac{1}{Xt}\right)$ wherein t : reaction time
Xo : initial benzene yield
Xt : benzene yield after t hour reaction
**Value after 3 hour reaction.

What is claimed is:

1. In a method for preparing a hydrocarbon conversion catalyst comprising a refractory inorganic oxide carrier, 0.01 to 3 weight % of a Group VIII noble metal component, a tin component and 0.1 to 3 weight % of a halogen component by the procedure of impregnating said carrier with a solution or solutions containing said metal and halogen components, the improvement which comprises a step of impregnating the said carrier with a solution comprising from about 0.01 to 2 weight % of a soluble compound of tin in a solvent comprising an acid amide selected from the group consisting of primary amides, secondary amides, tertiary amides and mixtures thereof and washing and drying the impregnated carrier.

2. The method of claim 1 wherein said acid amide is a dialkyl formamide.

3. The method of claim 2 wherein said dialkyl formamide is dimethyl formamide.

4. The method of claim 1 wherein said Group VIII noble metal component is platinum.

5. The method of claim 1 wherein said halogen component is chlorine or fluorine.

6. The method of claim 1 wherein said soluble compound of tin is stannous chloride.

7. The method of claim 1 wherein said carrier comprises alumina.

8. The method of claim 1 wherein said carrier has been impregnated with said Group VIII noble metal component and said halogen component prior to impregnation with said solution of a soluble compound of tin.

9. The method of claim 1 wherein said catalyst comprises a third metallic component in addition to said Group VIII noble metal and tin components.

10. The method of claim 1 wherein said solution comprises from about 2 to 15 wt. % water in addition to said acid amide or a derivative thereof.

11. The method of claim 1 wherein said alumina has a surface area of more than 50 m$^2$/g, a bulk density of about 0.3 to 0.8 g/ml, an average pore volume of about 0.2 to 1.1 ml/g and an average pore diameter of about 50 to 300A.

12. The method of claim 4 wherein said catalyst comprises from about 0.05 to 1 weight % platinum.

13. A method for preparing a hydrocarbon conversion catalyst which comprises the following steps in combination:
  1. impregnating a refractory inorganic oxide carrier with an aqueous halogen acid solution containing from about 0.01 to 2 weight % of a Group VIII noble metal;
  2. washing and drying the impregnated carrier from step (1);
  3. impregnating the product of step (2) with a solution comprising an acid amide selected from the group consisting of primary amides, secondary amides, tertiary amides and mixtures thereof, and from about 0.01 to 2 weight % of a soluble compound of tin; and
  4. washing and drying the product of step 3.

14. The method of claim 13 wherein said aqueous halogen acid solution is a hydrochloric acid solution and said Group VIII noble metal is platinum.

15. The method of claim 13 wherein said tin compound is stannous chloride and said acid amide is dimethyl formamide.

16. the method of claim 14 wherein said aqueous halogen acid solution contains from about 0.05 to 1 weight % of said platinum component.

17. The method of claim 15 wherein said dimethyl formamide contains from about 0.05 to 1 weight % of said stannous chloride.

* * * * *